United States Patent Office 3,461,710
Patented Aug. 19, 1969

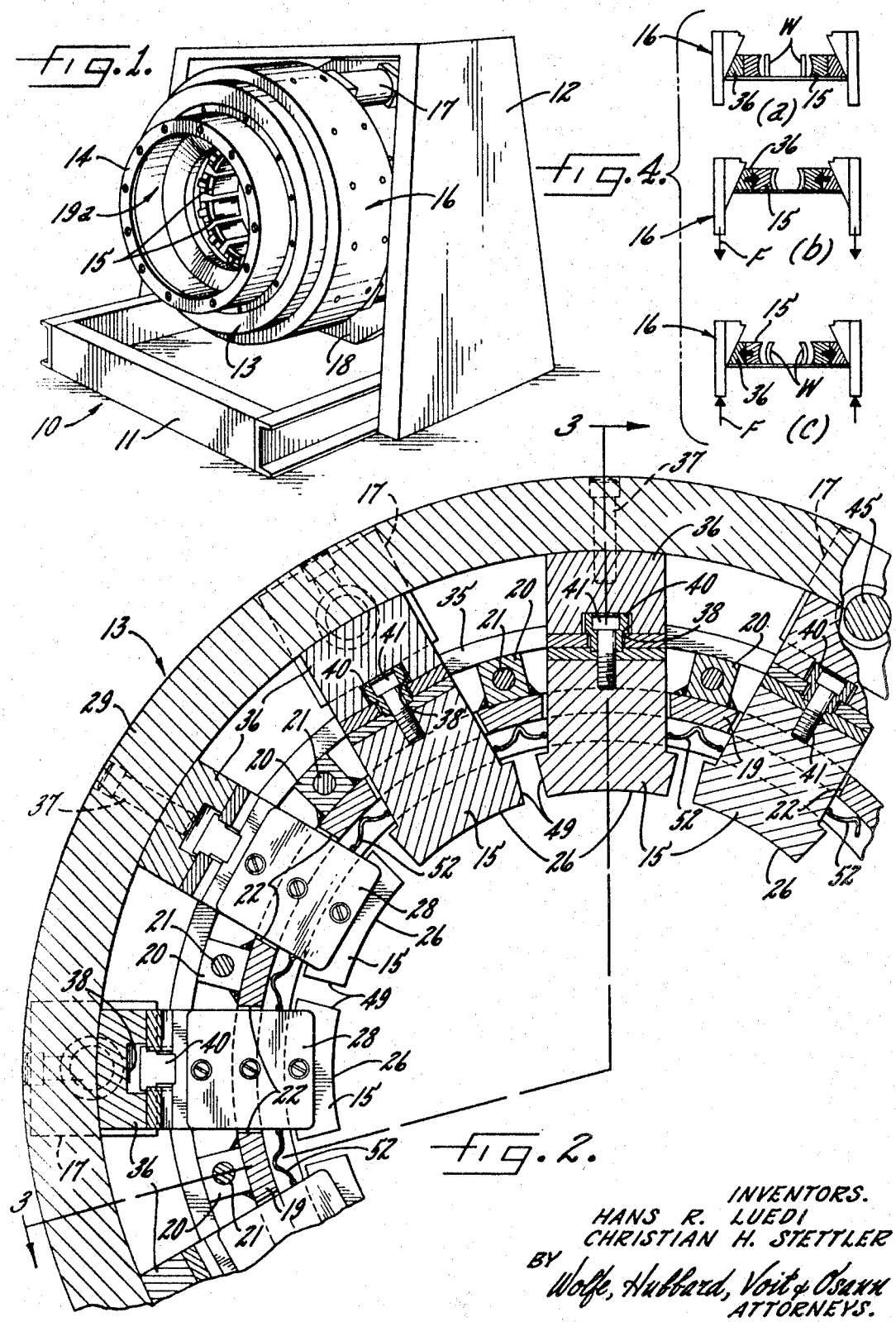

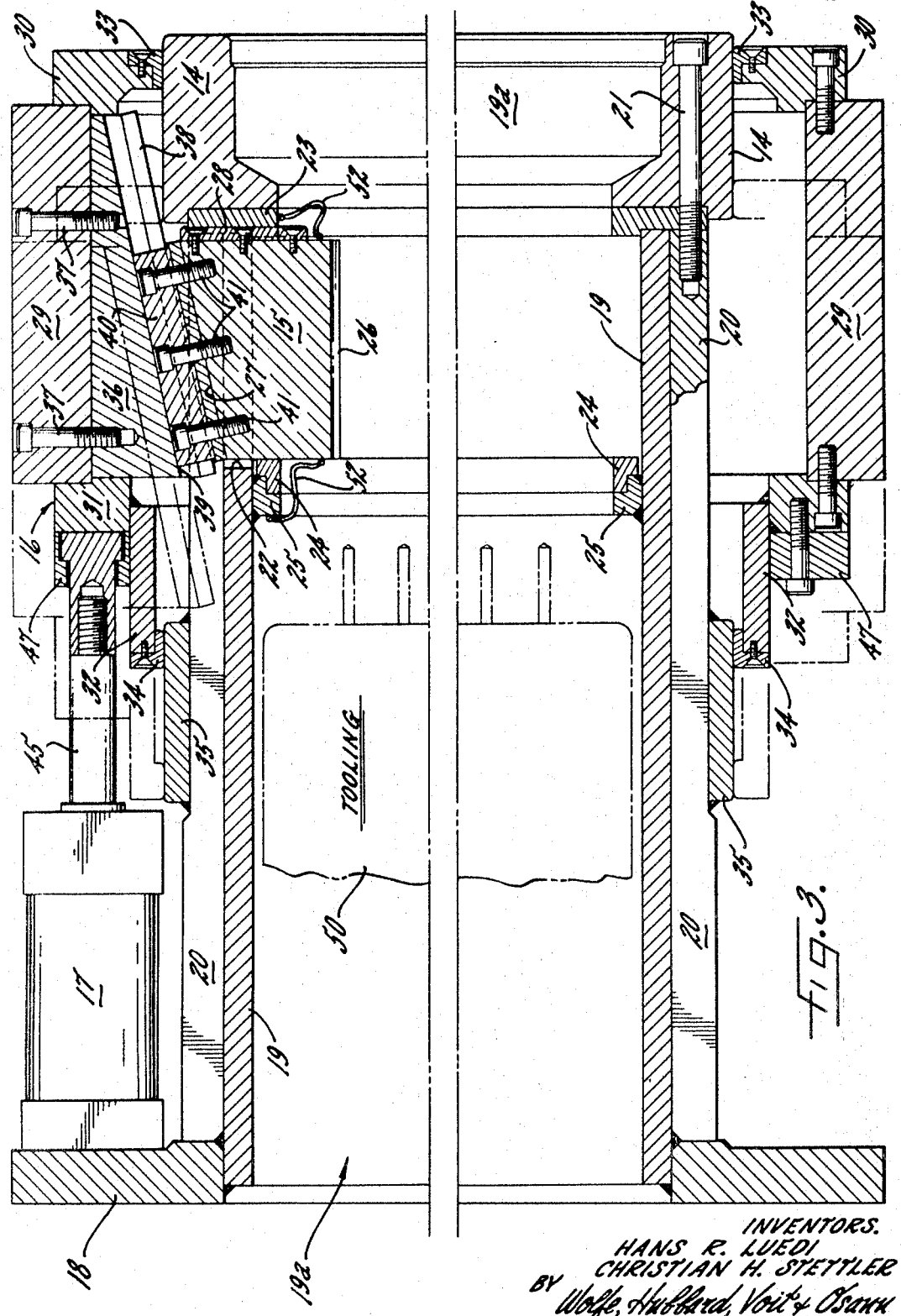

3,461,710
METHODS AND APPARATUS FOR SHRINK FORMING METAL ARTICLES
Hans R. Luedi, Highland Park, and Christian H. Stettler, Northbrook, Ill., assignors to Grotnes Machine Works, Inc.
Filed Dec. 28, 1967, Ser. No. 694,237
Int. Cl. B21d 31/00, 41/00; B21j 7/16
U.S. Cl. 72—372                                   8 Claims

ABSTRACT OF THE DISCLOSURE

The disclosure relates to method and apparatus for radially shrinking annular workpieces wherein provision is made for insertion of the annular workpiece into the apparatus at one end and at the other end of the apparatus workpiece forming tools may be inserted so as to perform work after the workpiece has been shrunk.

---

The present invention relates generally to methods and apparatus for metal forming, and more particularly, to methods and apparatus for shrinking or radial compression forming of metal articles. In its principal aspect, the invention is concerned with improved methods and apparatus for shrinking or radial compression forming of metal articles on a continuous basis, yet without having to change the direction of article feed and wherein unobstructed pass through of the articles is accomplished with open access to the article from opposite ends thereof enabling performance of auxiliary operations in the same work station.

Many benefits and advantages can be derived from the utilization of shrinking or radial compression forming of metal articles, particularly, where a product to be formed is relatively small and accuracy is critical. Most tubular products such as pipe and the like are formed from a blank of sheet material which is rolled into shape and then welded lengthwise. The presence of the longitudinally extending seam imposes some limitataions upon subsequent cold working operations which are performed to increase the strength properties of the pipe. Shrinking enables the pipe to be cold worked without fear of damaging the seam or weld.

Compression forming is extremely useful in the manufacture of metal articles of various geometrical shapes where stresses and deformities occur which warp the article out of the desired final shape. A sizing operation is thus made necessary in order to bring the workpiece back into its design tolerances.

Shrinking apparatus has heretofore been utilized for compression forming and sizing of metal articles. However, such shrinking apparatus has been limited to the introduction of workpieces from one end and removal of the workpiece after the shrinking operation from the same end to which it was introduced into the machine. Consequently, such shrinking apparatus are incapable of handling products on a continuous basis without change in the direction of product feed.

One approach which has been proposed for a continuous through feed shrinking apparatus involved the use of a hollow piston having tapered surfaces on the inner surface thereof for supporting a concentrically disposed array of die segments and for driving such segments radially inward to shrink an article passed axially through the apparatus. Such a system presents certain disadvantages which render it incapable of solving the problems faced by manufacturers in the metal working industry even though there has been a need for the continuous feed through shrinker for many years.

Merely by way of example, difficulties would be encountered in forming a piston which would have the requisite inner tapered surface due to the extremely close tolerances and necessary critical machining. This would particularly be the case where the machine is to work with small diameter workpieces because the internal diameter of the piston would also be relatively small. If the machine is intended to work on large diameter workpieces then machining of the internal surface may be accomplished but then the piston, in order to withstand the reaction force imposed during a shrinking operation, becomes so large that other economic and practical disadvantages are encountered. Moreover, sealing problems between the piston and its associated cylinder would be encountered because of the reactive loading of the piston during shrinking cycles.

Accordingly, it is a general aim of the present invention to provide methods and apparatus which overcome all of the foregoing disadvantages and which are characterized by their ability to shrink metal articles on a continuous basis without having to change the direction of article feed. While not so limited in its application, the invention will find especially advantageous use in final shrink forming of automobile wheels fabricated by welding various steel stampings together to bring the wheel within the allowable tolerances of diameter and roundness.

In another of its important aspects, it is an object of the invention to provide improved methods and apparatus for through feed shrinking of metal articles wherein unobstructed pass through of the articles is accomplished with open access to the articles from the opposite ends thereof and enabling performance of auxiliary operations on the artcle in the same work station. In this connection, it is an object to provide a shrinking apparatus into which a product can be fed freely from one end while suitable other tooling can be fed from the opposite end.

It is still another object of the present invention to provide a through feed shrinking or radial compression forming apparatus which is capable of handling articles having surface dirt or mill scale which may flake or chip off during the forming operation without interference to the forming operation.

It is a more specific object of the invention to provide an improved shrinking apparatus which is extremely versatile and capable of being operated as a horizontal, vertical or continuous through feed machine. In this connection, it is an object to provide a relatively simple, reliable shrinking apparatus which is particularly suitable for use in mass production manufacturing operations.

Other objects and advantages of the invention will become apparent as the following description proceeds, taken in conjunction with the accompanying drawings, in which:

FIGURE 1 is a perspective view of an exemplary through feed shrink forming apparatus embodying the features of the present invention;

FIG. 2 is an enlarged fragmentary sectional view of the forming head taken perpendicular to the central axis of the machine in FIG. 1;

FIG. 3 is an enlarged broken sectional view taken along the line 3—3 in FIG. 2, and depicting the use of an exemplary auxiliary tooling for carrying out the methods in accordance with the present invention; and FIGS. 4a, b, and c are diagrammataic representations of the basic shrinking operation carried out by the apparatus of the present invention.

While the invention is susceptible of various modifications and alternative forms, a specific embodiment thereof has been shown by way of example and will herein be described in detail. It should be understood, however, that it is not intended to limit the invention to the particular form disclosed, but, on the contrary, the intention is to cover all modifications, equivalents and alternatives that fall within the spirit and scope of the invention as expressed in the appended claims.

Referring now to the drawings, there is shown in FIG. 1, an exemplary shrink forming apparatus, generally indicated at 10, which is particularly suited for continuous shrinking or radial compression forming of relatively long lengths of various geometrically shaped articles which can extend completely through the machine, in accordance with the present invention. In the illustrative form of the invention, the shrinking apparatus 10 includes a frame having a generally horizontal base 11 and a vertically oriented portion 12 forming a protective housing which is adapted to receive a longitudinally extending forming head generally indicated at 13. As shown in FIG. 1, the forming head 13 comprises a mouth ring 14 through which workpieces pass with a plurality of die segments 15 disposed peripherally about an opening extending longitudinally completely through the forming head. The die segments are adapted to move radially inwardly to compress the outer perimeter of a workpiece disposed within the central opening and retract radially outwardly to permit removal and insertion of articles to be worked on.

For the purpose of effecting controlled radially inward and outward movement of the die segments 15, there is provided an outer pressure ring assembly 16 which is adapted to be slidable axially with respect to the longitudinal axis of the machine under the control of fluid actuating means which in the present instance comprises hydraulic cylinders 17 (one being shown in FIG. 1).

Referring to FIGS. 2 and 3, conjointly, the exemplary arrangement is such that a plurality of cylinders 17 are disposed in an annular array concentric with the axis of the shrinking machine and to the left of the pressure ring assembly 16, as viewed in FIG. 3. The cylinders 17 are supported by a reaction ring 18 located at the rear end of the forming head and are operated in mechanical synchronization from a suitable source of pressurized fluid (not shown) in a conventional manner well known to those skilled in the art.

In carrying out the present invention, forming head components are concentrically disposed about a relatively large central opening indicated generally at 19a so that the head 13 is open ended and unobstructed to enable workpieces to be passed completely through the machine. To this end, the central opening is defined by a generally cylindrical body 19, with its rear end being secured by welding or the like to reaction ring 18 (FIG. 3). A plurality of reinforcing ribs 20 are welded about the periphery of the body 19 in a spaced array for stiffening the structure and for supporting the mouth ring 14 which is suitably secured thereto by bolts 21 or the like.

Disposed circumferentially about the mouth end of body 19 are a plurality of spaced radial openings 22 arranged in the form of a segmented circular band. The openings 22 in the illustrative embodiment are rectangular, and the opposite ends thereof, located fore-and-aft in the axial direction, are provided with bearing surfaces. At the mouth end of each opeening is a bronze wearing surface formed by a circular bronze ring 23 sandwiched between the mouth ring 14 and the body 19. At the opposite end, another bronze ring 24 is secured in place against a welded-in shoulder ring 25.

In keeping with the present invention, within each opening 22 is a die segment 15, which bears against the bronze rings 23, 24. Each die segment 15 has an inner forming surface 26 directed radially inwardly of the body 19, and an upper pressure face 27 defining a plane disposed at an acute angle to the central axis of the machine. Attached to the forward face of each of the die segments is a replaceable wear plate 28.

In accordance with one of the important aspects of the present invention, pressure ring assembly 16 surrounds the body 19 and mouth ring 14 and is supported and guided at both ends for axial sliding movement on the machine body. The pressure ring assembly is built up of several rings, consisting of a main ring 29, a forward guide ring 30, an actuator mounting ring 31 and a rear guide ring 32, all fabricated into a unit by suitable fastening bolts and welds. Surrounding the mouth ring 14 is a bronze forward bushing 33 which is slidable on the outer circumference of the mouth ring 14 itself, the mouth ring thus forming a continuous way for the sliding bushing 33. At the opposite end of pressure ring assembly 16, there is a rear bushing 34 which is slidable on a continuous way formed by bearing ring 35 secured to ribs 20 of body 19. In order to prevent canting or binding of the pressure ring assembly during operation, the bushings 33, 34 spaced on opposite sides of the die segments 15 are separated by an axial distance of at least about 50% of the average operating diameter of the two bushings. The main ring 29 of pressure ring assembly 16 is made of heavy construction because this member serves as a reaction member and resists the greater portion of the large compressive forces transmitted to the workpieces during the shrink forming operation.

In order to move the die segments radially inward during the power stroke of the fluid actuators 17 and forward axial movement of the pressure ring assembly 16, a plurality of wedge blocks 36 are spaced about the inner surface of the main ring 29 and secured by bolts 37 in positions corresponding to the openings 22 in the body 20. It is a significant advantage of this construction that the pressure ring assembly 16, which tends to increase in diameter while resisting the large pressure forces created by the shrink forming operation, may expand radially to any required degree without binding or interfering with other parts of the machine. As best shown by reference to FIG. 3, each wedge block 36 has an inner ramp surface 38 which defines an angled plane parallel to that of the corresponding pressure face 27 of its adjacent die segment 15.

For the purpose of insuring that the die segments 15 are constrained for sliding movement along the wedge block 36 in radial lines, each die segment 15 is slidably secured to its respective wedge block by means of a gib construction generally indicated at 39a (FIG. 2). As here shown, the gib construction comprises an axially extending T-shaped groove 39 formed in each ramp surface 38 of wedge blocks 36 and complementary T-shaped lugs 40 attached to die segments 15 with bolts 41.

In order to more fully understand the mode of operation of the exemplary shrink forming apparatus 10, reference is made to FIG. 4, conjointly with FIGS. 2 and 3, wherein the former illustrates diagrammatically the sequence of operation of the machines. Thus, when the cylinders are simultaneously energized by pressure fluid, a linear force F (FIG. 4) is transmitted to pressure ring assembly 14 through actuation rods 45 (FIG. 3). The pressure ring assembly 16 is moved forwardly, to the right as viewed in FIG. 3, along the ways formed by the outer surfaces of the bearing ring 35 and the mouth ring 14. Movement of the pressure ring assembly 14 in an axial direction carried with it the attached wedge blocks 36, and forcibly drives the die segments 15 radially inward. The radially inward force thus created is greatly amplified because of the acute angle of ramp faces 38 on each wedge block 36 and the pressure face 27 on each die segment 15 relative to the axis of actuation movement.

It may be seen by reference to FIG. 3 that the extreme forward and rear positions of the slidable pressure ring assembly 14 also define the limits of radial movement of the die segments 15. When the pressure ring assembly 16 is retracted rearwardly by the reverse stroke of the cylinders 17, the die segments 15 ride along the undercut slots 39 in the ramp faces 38 of the wedge blocks 36 toward the narrow forward end of the wedges. In this position the contractable die formed by the plurality of die segments 15 is at its maximum diameter. A limit on radial movement in the outward direction is achieved by contact of the wedge blocks 36 with the rear bearing ring 35. At the other extreme, a forward power stroke by the cylinders 17 moves the die segments 15 to the opposite end of the wedge blocks 36, thus forcing them inwardly to engage a workpiece. In this position, the radial side surfaces 49 of the wedge-shaped die segments 15 could come into contact. Radial movement is controlled by stroke of cylinders 17 or by other stroke controlling means.

In accordance with yet another feature of the invention, it may be seen from reference to FIG. 3 that auxiliary tooling 50, indicated in phantom, may be mounted within the inner bore of the body 19 and from the rear of the apparatus. Such equipment would be utilized with workpieces which did not require a free passage throughout the length of the machine, but which may require additional forming or machining steps while securely gripped within the closed forming die segments 15. For example, automobile wheels which had been fabricated by welding from various steel stampings or pressings can be subjected to a final shrink forming operation to bring them within allowable tolerances of diameter and roundness. While securely held in this position by the die segments 15, it may be advantageous to precisely locate the mounting holes which secure the wheel to its hub, for instance by reaming. A power reamer having a precisely located cutting head corresponding to each of the holes in the finished wheel would then be installed as auxiliary tooling 50 within the space provided in the body 19. Operation of the machine with such tooling would in accordance with the method of the invention take place in the following sequence. The article to be compression formed is placed within the expanded shrinking dies and the dies are closed to size the article and grip it securely. While the workpiece is thus held, the auxiliary tooling 50 is introduced to perform another operation in the same work station, the auxiliary tooling 50 is then retracted, and the dies are then expanded to permit removal of the finished article. It will be understood, of course, that other types of systems may be employed where it is desired to have a shrinker through which a product can be fed freely or into which a product can be fed from one end while suitable tooling and actuating means therefore enter the product from the opposite end.

In keeping with the present invention, provision is made for protecting the moving components from scale and other debris that may be present. To this end, flexible protective covers 52 are provided which surround the various sliding surfaces of the die segments 15. Preferably, these covers are made of flexible plastic or leather, and are secured to the moving elements which they protect by an elastic band to assure a tight friction fit. It will be observed, however, that the feed-through feature of the present apparatus allows the assembly to be mounted with its central axis in a vertical direction, thus allowing mill, scale, dirt and other debris to drop freely out of the machine. In many instances it has been found that such dust covers 52 are unnecessary for this reason.

We claim as our invention:

1. A feed-through shrink forming apparatus comprising, in combination,
   (a) a substantially cylindrical body open at each end and having a plurality of circumferentially spaced radial openings adjacent one end,
   (b) a pressure ring concentric with and slidably retained for axial movement about said body in surrounding relationship to said openings,
   (c) said pressure ring having a plurality of inwardly facing ramps each disposed opposite an opening in said body, said ramps each defining an acute angle to the central axis of said body,
   (d) a plurality of die segments each slidably retained for radial movement between outer and inner limits within an opening in said body, each segment having an angled pressure face coplanar with a corresponding ramp of said pressure ring and a forming surface directed radially inwardly of said body,
   (e) said die segments defining at their inner limits of radial movement a substantially continuous circumferential forming die of predetermined dimensions, and
   (f) power actuator means carried by and circumferentially surrounding said body and engaging said pressure ring for delivery of a linear power stroke in a direction tending to wedge said die segments inwardly to their inner limits of radial movement.

2. Apparatus as defined in claim 1 in which the corresponding coplanar ramps and pressure faces constrained for linear sliding movement, and in which said power actuator means is operative to deliver a linear retraction stroke for drawing said die segments outwardly to their outer limits of radial movement.

3. Apparatus as defined in claim 2 in which said power actuator means comprises a plurality of circumferentially spaced double-acting fluid cylinders.

4. Apparatus as defined in claim 1 in which said pressure ring is slidably retained on ways carried by said body, said ways being axially spaced on opposite sides of said openings and spaced apart by a distance of at least about 50% of the outer diameter of said ways.

5. Apparatus as defined in claim 1 in which the sliding surfaces of each of said die segments are separated from the interior of said body by covers consisting of flexible sheet material.

6. Apparatus as defined in claim 1 in which auxiliary tooling means is carried at one end of said body for operative engagement with a workpiece being gripped by said die segments at their inner limits of radial movement.

7. The method of forming metal articles comprising the steps of introducing the article into one end of a through-feed shrinking apparatus having a plurality of radially inwardly contracting die segments contracting said segments into engagement with the article to compression form the same and substantially simultaneously introducing auxiliary tooling into the opposite end of said through-feed shrinking apparatus for performing additional operations on said article in the same work station.

8. A feed-through shrink forming apparatus comprising, in combination,
   (a) a substantially cylindrical body open at each end,
   (b) a pressure ring concentric with and slidably retained for axial movement about said body in surrounding relationship thereto,
   (c) said pressure ring having a plurality of inwardly facing ramps disposed about the internal periphery of said ring, each of said ramps having a face defining an acute angle to the central axis of said body,
(d) a plurality of die segments each slidably retained for radial movement between outer and inner limits within the opening in said body, each segment having an angled pressure face coplanar with a corresponding ramp of said pressure ring and a forming surface directed radially inwardly of said body, and
(e) power actuator means engaging said pressure ring for delivery of a linear power stroke in a direction tending to wedge said die segments radially inwardly in said body opening.

References Cited

UNITED STATES PATENTS

| | | | |
|---|---|---|---|
| 936,435 | 10/1909 | Evans | 72—402 |
| 2,428,419 | 10/1947 | Green | 72—402 |
| 2,999,405 | 9/1961 | Ewart | 72—402 |

RONALD D. GREFE, Primary Examiner

U.S. Cl. X.R.

72—402